UNITED STATES PATENT OFFICE.

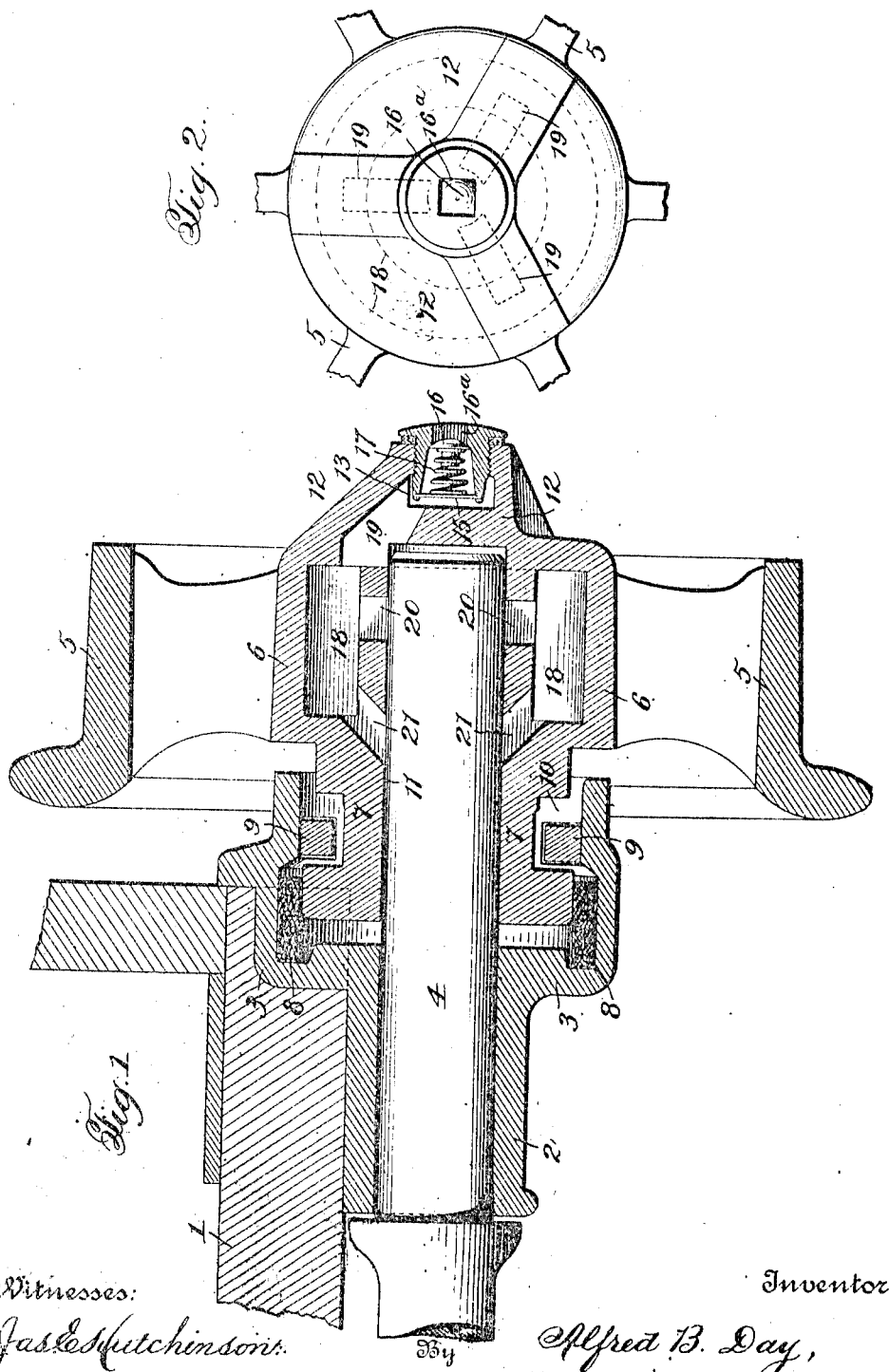

ALFRED BRYANT DAY, OF KNOXVILLE, TENNESSEE.

MINING-CAR WHEEL.

1,117,344.

Specification of Letters Patent.

Patented Nov. 17, 1914.

Application filed June 25, 1914. Serial No. 847,210.

*To all whom it may concern:*

Be it known that I, ALFRED B. DAY, a citizen of the United States, residing at Knoxville, in the county of Knox and State of Tennessee, have invented certain new and useful Improvements in Mining-Car Wheels, of which the following is a specification, reference being had therein to the accompanying drawing.

My invention relates to wheels, and while applicable to different uses, is more especially designed for service in connection with mining car constructions.

In my former Patent No. 870941, issued November 12, 1907, there is disclosed a type of car wheel which has gone into extensive use and proven largely satisfactory, especially in the lubricating characteristics thereof. In this patent the lubricant is admitted through a valve controlled opening in the hub cap, and the present invention is designed to improve on the construction of my former patent, while, at the same time, to preserve the advantages of feeding the lubricant through the hub cap substantially as illustrated in the patented construction. In the patented construction a key lock is provided between the outer end of the axle and the hub part whereby to resist the end thrust of the axle in rounding curves, but in practice it has been found highly desirable to provide an end thrust bearing on the hub cap, substantially centrally thereof, to be engaged by the end of the axle, thereby considerably reducing the friction of these parts in their relative rotary movement, and to protect the peripheral portions of the axle and hub against unnecessary wear.

Having in mind the advantages of the central end thrust bearing on the hub cap, the present invention is designed to provide a wheel, the hub of which has a central end thrust bearing for the axle, and also has an oil receiving opening with connecting channels leading to the periphery of the axle, the said opening and channels being constructed and arranged whereby the hub cap will not be materially weakened, and will adequately withstand the end thrust of the axle without appreciable wear upon the parts.

In my Patent No. 907750, issued December 29, 1908, is illustrated a hub cap having an end thrust bearing for the axle, but this structure, while satisfactory in many particulars, is open to the objection of engaging the axle at the periphery, with the incident wear and friction between the parts, all of which is overcome by my present improvement.

More particularly the present invention includes a hollow hub part having in its cap portion a substantially central oil receiving opening, and said cap portion being enlarged whereby to provide a central abutment overlying the oil receiving opening, and adapted to be engaged by the end of the axle, the peripheral wall of the hub being provided with spaced oil channels leading from the oil inlet to various points about the periphery of the axle. Coöperating means is also provided between the inner end of the hub and axle members to resist end thrusts in an opposite direction.

It is a further object of the present invention to provide a wheel of the character stated, simple in design and construction, cheap to produce, easy to thoroughly lubricate, and otherwise highly efficient and durable in use.

Other objects, improvements and novel details in the construction and arrangement of parts will be more readily appreciated from the description to follow, which, for a clear understanding of the invention, is to be considered in connection with the accompanying drawings forming a part hereof, and wherein is disclosed, for the purpose of illustration, a convenient and satisfactory embodiment of the invention.

In the drawings:—Figure 1 is a vertical longitudinal sectional view of my improvement, and Fig. 2 is an end view of the hub.

With more particular reference to the drawings, wherein like reference numerals refer to corresponding parts throughout the several views, 1 is a section of a car frame broken away, and 2, a pedestal member of any desired construction, having an axle opening extending therethrough and an enlarged hub receiving portion 3; 4 is the axle, the same being mounted in any desired manner and preferably fixed against rotation; 5 is a rotatable wheel the same having a hub part 6, the inner end of which is extended at 7, so as to be positioned within the hub receiving part of the pedestal 8.

A suitable felt packing 8 may be employed, as illustrated, and preferably that portion of the hub within the pedestal member is spaced at all points from the pedestal member, whereby to receive suitable lubricant packing, if desired, and to eliminate friction between these parts.

Suitable lock keys 9, preferably square in cross section, may be provided, the same projecting through the wall of the pedestal member and adapted to be positioned in a groove or channel 10, provided in the periphery of the hub portion 7. Preferably the side wall of the groove 10 is substantially straight, and of substantially the same width as that of the keys 9 whereby to provide an extended flat bearing surface for the key. The hub portion of the wheel is provided with a central axle receiving opening 11, and a relatively thick cap portion 12, preferably integral therewith, the said portion 12 overlying substantially the entire surface of the end of the axle to provide a central end thrust bearing for the axle.

Arranged in the cap portion 12 at the rear of the end thrust bearing is a suitable oil chamber 13, communicating with a threaded opening in the end wall of the hub cap. Adapted to be positioned in said threaded opening is a suitable valve carrying member 14, in the form of a threaded nut, the valve carrying member 14 being hollow and having at its inner end a suitable perforated screen and abutment 15. A disk-shaped valve 16 is adapted to normally close the inlet opening 16ª of the nut 14, the same being held to its seat normally by the means of a suitable spiral spring 17 engaging at one end on the inner surface of the valve disk 16, and at its opposite end the abutment 15. 18 are suitable reservoirs in the periphery of the hub member 16, the said reservoirs being in communication with the oil chamber 13, by means of channels 19, arranged in the wall of the hub member. Preferably the oil reservoirs 18 and channels 19 are spaced about the periphery of the hub 6, three (3) being shown for the purpose of illustration, and they are so constructed and arranged that they will not tend to weaken the end thrust bearing portion 12 of said hub. The channels 19 preferably incline from their point of connection with the oil chambers 13 to their point of connection with the oil reservoirs 18, and said channels preferably communicate with that portion of the axle receiving opening of the hub adjacent the periphery of the end of the axle, to the end that this portion of the axle may be lubricated. To provide for the lubrication of other portions of the axle the reservoirs 18 communicate with the axle through suitable oil ways 20 and 21. In this way all portions of the axle within the hub will be adequately lubricated.

The construction and operation of the device will be clear to those skilled in the art from the above description it being noted in this connection that when in use the wheel thrusts will be resisted in one direction by the key members 9, and in an opposite direction by the end thrust bearing 12, engaging over the end of the axle. This end thrust bearing affords the least resistance to the parts in their relative rotary movement.

When it is desired to lubricate the bearing it is only necessary to force the valve disk 16 against the action of its spring and insert the oil into the oil chamber 13 from whence it flows through the channels 19 into the reservoirs 18, and thence through the openings 20 and 21 into contact with the axle, a certain portion of the oil finding a way to the end of the axle in its passage through the channels 19. Should it be desired to insert a heavy lubricant, the valve carrying nut 14 and its associated parts may be removed from the threaded opening of the hub cap and the lubricant inserted directly through the opening of the hub cap.

The central end thrust bearing provided by the hub for the end of the axle will not tend to wear away the outer edge of the axle, and, on the other hand, the axle itself cannot work against and destroy the surface of the spring valve which is protected by the end thrust bearing.

I claim:—

1. In a wheel, the combination of a pedestal having a hub receiving portion, a wheel having a hub loosely positioned in said hub receiving portion, said hub being hollow to receive the end of an axle, and the hub cap having a substantially central end thrust bearing part for the end of the axle and also having an oil inlet and a connecting channel leading to the periphery of the axle.

2. In a wheel, the combination of a pedestal having a hub receiving portion, a wheel having a hub loosely positioned in said hub receiving portion, said hub being hollow to receive the end of an axle, and the hub cap having a substantially central end thrust bearing part for the end of the axle and also having a substantially central oil inlet and channels leading to the longitudinally spaced portions of the periphery of the axle, said channels having communication through the periphery of the hub to the oil inlet.

3. In a device of the character described, a pedestal, a wheel having a hub rotatably mounted on said pedestal, the hub cap having an oil inlet and a central end thrust bearing for the axle, and said hub also having an oil chamber to the rear of said bearing communicating with the inlet and an oil channel arranged at opposite sides of the end thrust bearing communicating with the oil chamber and leading to the periphery of the axle.

4. In a mining car wheel construction, the combination of a hub having an opening for the reception of an axle end, the end wall of the hub being relatively thick to provide a central end thrust bearing for the axle, an oil chamber in the end wall of the hub in the rear of said bearing, an oil inlet leading to said oil chamber, and an oil passage establishing communication between said chamber and the axle.

5. In a mining car wheel construction, the combination of a hub having an opening for the reception of an axle end, the end wall of the hub being relatively thick to provide a central end thrust bearing for the axle, an oil chamber in the end wall of the hub in the rear of said bearing, an oil inlet leading to said oil chamber, an oil reservoir in the peripheral wall of the hub in communication with the oil chamber, oil outlets leading to the axle from said reservoir, and an oil inlet in the end of the hub.

6. In a mining car wheel construction, the combination of a pedestal member having a hub receiving part, a wheel having a hub with a portion projecting into the hub receiving part of the pedestal, the said hub having an annular groove with straight sides, and a locking key projecting through the pedestal and having a straight edge to engage the straight side of said groove, an integral end thrust bearing on the hub adapted to overlie substantially the entire surface of the end of the axle, and said hub having an oil inlet in its end in the rear of said end thrust bearing, and communicating channels leading from said inlet through the periphery of the hub and communicating with the axle receiving portion of the hub.

7. In a mining car wheel, the combination of a pedestal having a hub receiving part, a wheel hub adapted to be positioned in the hub receiving part of the pedestal for rotatable movement, said hub having an axle receiving opening and an integral end thrust bearing extending substantially over the entire surface of the end of the axle, and an oil chamber at the rear of said end thrust bearing, and a channel leading from said oil chamber to the periphery of the end of the axle.

8. In a mining car wheel, the combination of a pedestal having a hub receiving part, a wheel hub adapted to be positioned in the hub receiving part of the pedestal for rotatable movement, said hub having an axle receiving opening and an integral end thrust bearing extending substantially over the entire surface of the end of the axle, and an oil chamber at the rear of said end thrust bearing, and a channel leading from said oil chamber to the periphery of the end of the axle, and additional oil channels leading to the axle at separated longitudinal points thereof.

9. In a mining car wheel, the combination of a pedestal having a hub receiving part, a wheel hub adapted to be positioned in the hub receiving part of the pedestal for rotatable movement, said hub having an axle receiving opening and an integral end thrust bearing extending substantially over the entire surface of the end of the axle, and an oil chamber at the rear of said end thrust bearing, channels leading from said oil chamber to the periphery of the end of the axle, a valve controlled inlet in the hub cap, and spring means in the oil chamber for normally holding said valve closed.

In testimony whereof I hereunto affix my signature in the presence of witnesses.

ALFRED BRYANT DAY.

Witnesses:
  A. A. SCHMID,
  F. W. PICKLE,
  L. S. STEEL.